(12) United States Patent
Daniel

(10) Patent No.: US 9,830,040 B1
(45) Date of Patent: Nov. 28, 2017

(54) SYSTEM AND METHOD FOR CONDUCTING A SPY GAME ON A SOCIAL NETWORK

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 227 days.

(21) Appl. No.: 14/734,956

(22) Filed: Jun. 9, 2015

Related U.S. Application Data

(60) Provisional application No. 62/009,756, filed on Jun. 9, 2014.

(51) Int. Cl.
| | |
|---|---|
| *H04N 21/258* | (2011.01) |
| *G06F 3/048* | (2013.01) |
| *H04L 12/58* | (2006.01) |
| *A63F 13/77* | (2014.01) |
| *A63F 13/792* | (2014.01) |
| *A63F 13/70* | (2014.01) |
| *A63F 13/44* | (2014.01) |
| *A63F 13/795* | (2014.01) |
| *A63F 13/46* | (2014.01) |

(52) U.S. Cl.
CPC ............ *G06F 3/048* (2013.01); *A63F 13/44* (2014.09); *A63F 13/46* (2014.09); *A63F 13/70* (2014.09); *A63F 13/77* (2014.09); *A63F 13/792* (2014.09); *A63F 13/795* (2014.09); *H04L 51/16* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 2011/0312409 A1* | 12/2011 | Vancura | .............. | G07F 17/3274 463/25 |
| 2012/0317593 A1* | 12/2012 | Myslinski | .............. | G06Q 10/10 725/14 |
| 2013/0247212 A1* | 9/2013 | Muriello | ................. | G06F 21/60 726/26 |
| 2013/0311484 A1* | 11/2013 | Zhou | ................. | G06F 17/30864 707/748 |
| 2014/0100007 A1* | 4/2014 | Kelly, Jr. | ............... | G06Q 50/01 463/3 |
| 2015/0193889 A1* | 7/2015 | Garg | ................. | G06Q 30/0251 705/14.49 |

\* cited by examiner

*Primary Examiner* — Jason Yen
(74) *Attorney, Agent, or Firm* — Alberto Interian III, Esq.

(57) ABSTRACT

The present disclosure relates generally to electronic systems, and more particularly, to systems, methods, and various other disclosures for conducting a spy game on a social network, allowing each player the opportunity to portray themselves as a spy. The objectives of the game is for (i) each player to play anonymously as all players are at least initially tasked with determining the truth or falsity of any new message post on a social network site; (ii) to increase his/her spy status and earn rewards (e.g. points or virtual currency); (iii) accumulate virtual wealth; and (iv) ultimately gain control of different players within different geographic regions around the world, a feat that is accomplished through gaining influence with each message post authored and/or responded to. Higher ranking spies are generally seeking to dethrone their competitors (other higher ranking spies) and/or reduce their competitor's wealth and influence.

20 Claims, 5 Drawing Sheets

SYSTEM AND METHOD FOR CONDUCTING A SPY GAME ON A SOCIAL NETWORK

PRIORITY CLAIM

This patent application is a Non-Provisional patent application and claims priority under 35 U.S.C. §119(e) to U.S. Provisional Patent Application Ser. No. 62/009,756, titled "System and Method for Conducting a Spy Game on a Social Network" filed Jun. 9, 2014. The entire disclosure of the afore-mentioned patent application is incorporated by reference as if fully stated herein.

FIELD OF THE INVENTION

The present disclosure relates generally to electronic systems, and more particularly, to systems, methods, and various other disclosures for conducting a spy game on a social network, allowing each player the opportunity to portray themselves as a spy. The objectives of the game is for (i) each player to play anonymously as all players are at least initially tasked with determining the truth or falsity of any new message post on a social network site; (ii) to increase his/her spy status and earn rewards (e.g. points or virtual currency); (iii) accumulate virtual wealth; and (iv) ultimately gain control of different players within different geographic regions around the world, a feat that is accomplished through gaining influence with each message post authored and/or responded to. Higher ranking spies are generally seeking to dethrone their competitors (other higher ranking spies) and/or reduce their competitor's wealth and influence.

SUMMARY OF THE INVENTION

The systems and methods described herein result from the realization that spy games can be broadened in scope and made more entertaining by allowing participants to develop their own story.

The systems and methods described herein also result from the realization that spy games can be further broadened in scope and made more entertaining by allowing each participant the opportunity to portray themselves as a spy, where the objective of the game is for each player to play anonymously so that all players are at least initially tasked with determining the truth or falsity of any new message post on a social networking site without being colored by the individual player's fame, notoriety and/or influence outside the game. The objective of the game is for each player to increase his/her spy status and earn rewards (e.g. points or virtual currency), accumulate virtual wealth and ultimately gain control of different geographic regions around the world, a feat that is accomplished through gaining influence with each message post authored and posted and/or responded to.

An aspect of an embodiment of the present invention may also include awarding points towards accumulated status to player for reposting verifiable true postings.

An aspect of an embodiment of the present invention may also include deducting points towards accumulated status to player for reposting unverified postings.

Yet another aspect of an embodiment of the present invention may include requiring a timed response to message post.

Another aspect of an embodiment of the present invention may include activating privacy controls for intercepting the at least one message post for controlling the display of the at least one message post.

Yet another aspect of an embodiment of the present invention may include determining the social influence of a particular player based on the number of repostings of the individual player's posts.

In certain aspects of an embodiment of the invention, there is a status hierarchy for the players: The identities of players are hidden; the challenge for players is to determine who and what level of influence other players really have. "Moles", every player is first designated as a "Mole," wherein the objective is to engage other players on the social network website, gain points to graduate to a higher ranking spy status, e.g. a Handler or Shadow Agent, where the Mole's engagement is determined by, for example, posting good intelligence, getting likes, having his/her message post(s) being shared and/or reposted, and the like.

"Handlers" are agents on the pulse of the "street" intelligence responsible for deploying Shadow Agents in the field to get information to pass on to the Agents of Intelligence. Handlers also have the ability to accumulate points for solid intelligence posted by their agents as well as the ability to recruit and develop a team/group of selected agents to gather information.

"Shadow Agents," also known as Shadows, are recognized as an aggregator of key content worthy of acknowledging. Their information is used by Handlers when gathering intelligence. Double Agents are Shadow Agents that have infiltrated an opposing agency organization posing as a Shadow Agent for that agency. They are able to play both fences however players are unsure whose side they are really on as Double Agents will sell their intelligence to the highest bidder as long as they benefit.

Agents of Intelligence (AOI) are field agents deployed in the field to garner key/relevant intelligence for the home agency. AOIs report directly to the Directors, and are responsible for sourcing and funneling information from Handlers to the Director; determining information that would benefit the home agency; determining and identifying Moles or double agents from other agencies trying to infiltrate their organization. AOI's may receive bids for their services from Directors and may benefit from the Director's resources as well as gain access to premium web features such as (more extensive avatar choices, preferential posting location within the social network and the ability to recruit and/or develop a team of Handlers and profit by receiving points from their intelligence posted.

Directors are the leaders of the spy agency that are responsible for deploying AOIs into the field and gaining key intelligence needed to build their empire. The objective of the Director is to direct the agents in the field, with the ultimate goal of expanding their empire's geographical region. Directors have access to virtual currency and have the ability to bid and profit from the message post of their AOI; assign negative points to players (who post negative or ineffective information), post messages/challenges to the social networking community; and the ability to create codes/icons in order to communicate with their specified AOI, who has the ability to decode the same.

In some aspects of the invention, the Spy Game Protocol includes various concepts, e.g. "Blown"—exposing the identity of a player; "Burned"—when an agent commits treason they are penalized. Must be court marshalled by which punishment is determined by the members of the community, and the player may plead their case and throw themselves on the mercy of the "court", i.e. the online community of the plurality of player's opinions and decisions "Exile"—punishment given to an agent that is exposed as having committed violations to the home agency; "Infiltrate"—when an agent disguises him/herself with the objective of entering the organization of a competing agency to obtain/gather intelligence with the intent of using that information for personal gain.

Accordingly, the various embodiments and disclosures described herein solve the limitations of the prior art in a new and novel manner. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

System Level Overview

Figure 1:
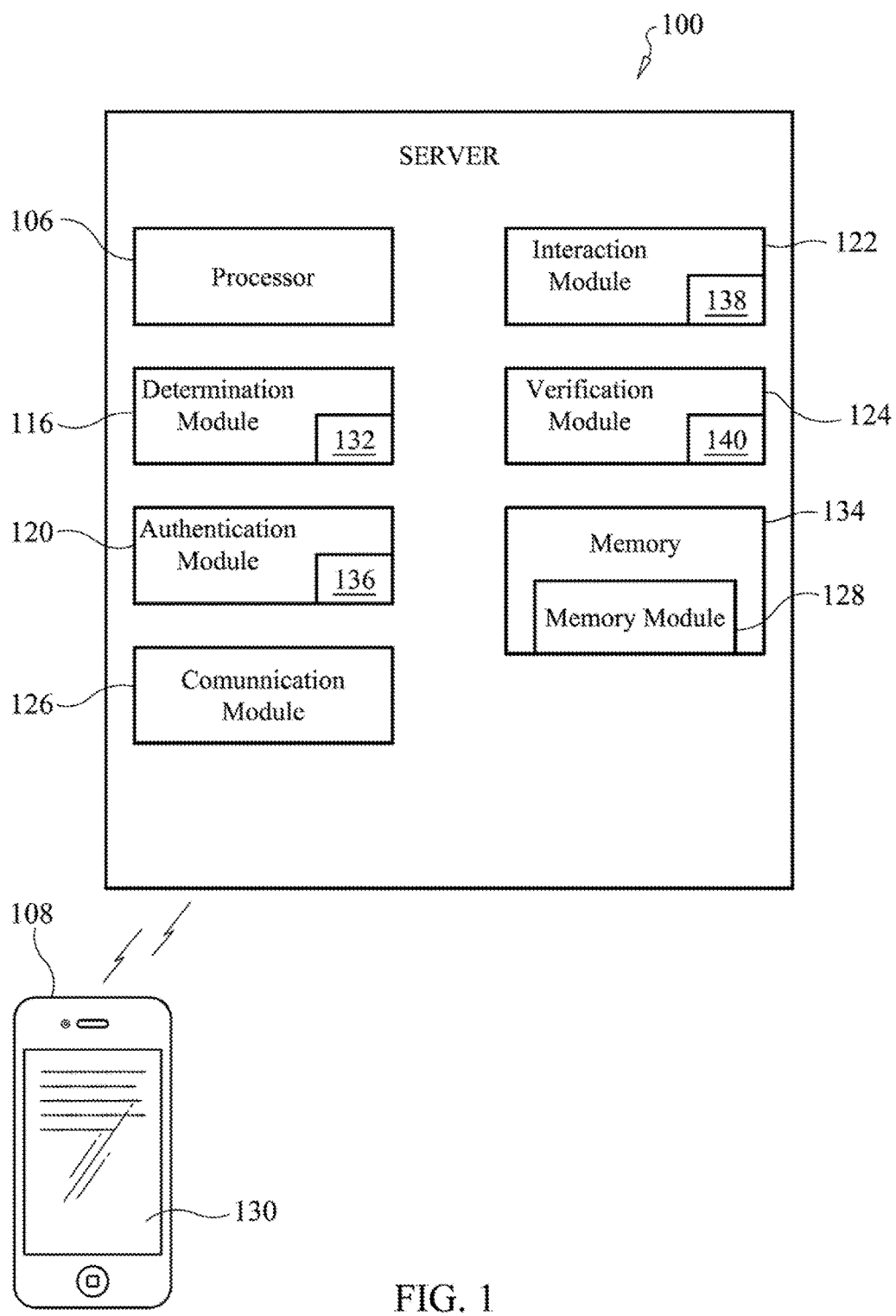
FIG. 1 shows an aspect of an exemplary embodiment of the system of the present invention.

The following discussion describes in detail an embodiment of the various systems and methods as described below. However, this discussion should not be construed, as limiting the invention to those particular embodiments, as practitioners skilled in the art will appreciate that a system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

FIG. 1 shows an exemplary system 100 according to an aspect of an embodiment of the present invention. System 100 comprises a computer server 102 for hosting a social network 104; at least one processor 106 in communication with the computer server 102; a network enabled communication device 108 in electronic communication with at least one processor 106 and configured for activating a displaying module 110 to broadcast at least one message post 112 of at least one player of a plurality of players and display the at least one message post 112 on a display 114 of the network enabled communication device 108; a determination module 116 in communication with the at least one processor 106, wherein the determination module 116 is configured for determining the presence of at least one subscriber identification identity 118 in the networked enabled communication device 108 of at least one player.

System 100 further comprises an authentication module 120 in communication with the at least one processor 106, wherein the authentication module 120 is configured for authenticating the at least one player's identity with the at least one subscriber identity linked to the at least one player; an interaction module 122 in communication with the at least one processor 106 wherein the interaction module 122 is configured for enabling player interaction with the at least one message post 112, wherein the interaction module 122 is further configured for enabling different player interactions by the plurality of players with the at least one message post 112 and for measuring a qualitative and/or quantitative response to the at least one message post 112 and determining a qualitative and/or quantitative award to all players for whom a response was measured as well as for the player who originated the at least one message post 112; a verification module 124 for intercepting the at least one message post 112 and verifying the veracity of the at least one message post 112; and a communication module 126 in communication with the network enabled communication device 108, wherein the communication module 126 is configured for enabling communication between all system modules, wherein the communication module 126 is further configured for enabling communications between the computer server 102 and the network enabled communication device 108.

In one aspect of an embodiment of the present invention, system 100 may be incorporated within a computer server 102 or a personal computer 202 configured for hosting a social network 104 over a computer network 206. Social network 104 may comprise of a dedicated website or other application, which enables the players to communicate and interact with each other's postings of data, comments, messages, images, and the like.

Processor 106 may be any type of processor, such as, but not limited to, a central processing unit (CPU), a microprocessor, a video processor, a front end processor, a coprocessor, a single-core processor, a multi-core processor, as well as any known processor 106 that is used in the arts. Processor 106 may be programmed to activate social network 104 being accessed by network enabled communication devices 210. Processor may be part of network enabled communication device 108, part of a stationary device, such as server, or both. Processor 106 may include computer executable instructions readable and executable by processor 106, which may be operative to perform all the necessary functions for the systems 100 and 200 and method 300 disclosed herein that are required by the computer sever 102 and/or the network enabled communication device's 108 hardware and software components. In one embodiment, the computer executable instructions may be downloaded to and stored in memory module 128. Alternatively, the computer executable instructions may be accessed via a network enabled communication device 108, which may include accessing the computer executable instructions over a network, such as, but not limited to, a wide area network or a local area network. In a further embodiment, the computer executable instructions may be accessed on a website that is network enabled communication device 108 accessible.

Network enabled communication device 108 may be any type of electronic computerized communication device configured with the ability to communicate wirelessly and/or wired with other network enabled communication devices such as but not limited to, cellular phones (e.g., an iPhone, Android, Palm, Blackberry, or any "smart phone" as are generally known and used in the arts), location-aware portable phones (such as GPS), a personal computer, server computer, tablet, a wearable device, laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network. "Computer" as used herein includes but is not limited to a network enabled computer, cellular phones like the network enabled communication device 108 described herein, a laptop or personal digital assistant subject to wired/wireless connectivity, and configured with Processor 106.

System 100 may further comprise at least one player input device 130 connected to processor 106. Input device 130 may comprise of a keyboard, a mouse, a button, a touch screen, a gesture control interface, and the like, where player may use the input device 130 to interact with the plurality of message posts 112 that are being displayed on display 114. In some embodiments, the computer executable instructions or code may operate on a network enabled communication device 108, such as a mobile computer, or a mobile phone, while in other embodiments, the computer executable instructions may operate on a stationary device, such as a personal computer or computer server. In some embodiments, the computer executable instructions may be a mobile phone application (a mobile "app"). In some embodiments, server may reside at a remote location. In another embodiment, the computer executable instructions may operate both on a network enabled communication device 108 and stationary device, and may include more than one set of computer executable instructions located on a network enabled communication device 108 and/or the stationary device, e.g. computer server 102. In yet another embodiment, the computer executable instructions may include computer executable instructions on a network enabled communication device 108 that work in conjunction with computer executable instructions on a stationary device. In another embodiment, the computer executable instructions or code may be readable by processor 106.

In an aspect of an embodiment of the present invention, the term "module" may represent self-contained computer hardware and/or software. In another aspect of an embodiment of the present invention, the term "module" may represent computer hardware on a designated computer chip or separate computer chips. In yet another aspect of an embodiment of the present invention, the processor 106 may be configured to perform tasks not undertaken by the module(s) disclosed herein. In a further aspect of an embodiment of the present invention, the modules may be hardware resident on one chip, component, separate components, a remote server, database, some or each of which (or all of which, in one aspect of an embodiment of the present invention) may be separate and distinct from the device, or any combination thereof. In one aspect of an embodiment of the present invention, a processor may be configured to coordinate, implement and/or assign tasks to, from and/or among the module(s). In a further aspect of an embodiment of the present invention, "module" may represent operational cooperation between system components. For instance, a display module 110 may comprise of the system processor 106, a display screen, memory, computer executable instructions executable by the processor and resident within memory location(s) etc. with each component being in communication with one or more other components in the module and each component working with the other component(s) to conduct the desired operation for which the module is configured to do e.g. display of content within memory. In some aspects of the invention, the display module 110, the display screen, memory, computer executable instructions are in electronic communication within the network enabled communication device 108 and are controlled by the network enabled communication device's processor of the type as discussed herein. In some embodiments, the computer executable code is executable by the processor and resident within memory 134. In a further aspect of an embodiment of the present invention, module components may also, in an operational context, be components of other modules. For instance a processor in a display module 110 may also be engaged by an interaction module 122 to help analyze data received via the input devices 130.

Determination module 116 may include the at least one processor(s) 106 and determination module code 132, i.e. computer executable code executable by the at least one processor(s) 106 resident on the computer server 102, enabled for determining the presence of at least one subscriber identity in a networked enabled communication device 108 being used by the at least one player. In a further aspect of an embodiment of the present invention, determination module 116 may include a SIM card reader and the at least one processor(s) 106 with computer executable code for determining if the player's network enabled communication device 108 includes a SIM 118. In some embodiments of the invention, each player is required to first register his/her game moniker (handle) as the true identities of the players remain undisclosed by, and during the game. As such, each message post 112 has added intrigue as players may engage in guessing the true identify of another player (even their friends) as unlike social networking sites where individuals may be followed because they are famous and/or popular, here in the game, a player will not be followed simply because of his/her true identity and/or popularity outside the game.

In some embodiments of the invention, registration of the network enabled communication device 108 and/or the corresponding SIM 118 is passive, i.e. during the registration process the determination module 116 detects the presence of at least one subscriber identification module for the network enabled communication device 108 that may be any type of subscriber identification module ("SIM") 118, such as a GSM SIM card, a software based SIM, a digital SIM, a smart SIM card, and the like, which may be a fixed or removable SIM card, and registers the same as a subscriber identity linked to the player. Subscriber identity may be any type of identity, such as a unique identification number, wherein the unique identification number may be associated with a specific internet protocol address for the network enabled communication device 108 and/or other identifiers associated with the SIM. In another embodiment, each subscriber identity may be associated with a specific geographical region or communications network service provider. In some embodiments, the SIM 118 is specifically coded and enabled for playing the game while in other embodiments compatible SIMs may suffice. The subscriber identity may be used to verify that game players are responding to the message posts 112 without leaving the confines of the social network 102 since in some aspects of an embodiment of the invention, game player is restricted from exiting the social network 102 to verify one or more facts and/or factoids contained in the message post 112 and in some embodiments there is also a restriction of requiring a timed response to message post 112.

In some embodiments, the game provides for a player's affirmative registration of the one or more network enabled communication device(s) 108 and/or the corresponding enabled SIM 118 for future game access.

Nonetheless, the determination of the presence of at least one SIM 118 for a networked enabled communication device 108 linked to the at least one player may be made possible by interaction between the processor 106 and determination module code 132. In one aspect of an embodiment of the present invention, determination module code 132, upon execution, enables processor 106 to act as SIM reader in order to detect the presence or absence of at least one SIM 118 in a networked enabled communication device 108 that may be linked to the at least one player. If the SIM 118 is detected, the player will be authenticated to ensure that the network enabled communication device 102 and/or the corresponding subscriber identity is linked to this player prior to the player being allowed to proceed with gaming. If no SIM 118 is detected, the gamer will be refused access to the social network game 104. In so doing the integrity of the game is maintained as players maintain their game identities and engage in subterfuge, switching alliances, etc. while maintaining the game's spy protocol keeping track of the plurality of player activities, status changes, message posts and the like.

In some aspects of the invention, authentication module 120 is in communication with the at least one processor 106, wherein the authentication module 120 is configured for authenticating the at least one player's identity with at least one registered subscriber identity linked to the at least one player. In some aspects of the invention, authentication module may include a processor (in another aspect, this may be processor 106), memory 134 and authentication module code 136, i.e. computer executable code executable by the processor, which when enabled causes the processor to inquire and capture the subscriber identity from the determination module code 132 that the authentication module code 136 issues a confirmation search request of the system's memory 134 as to whether the detected SIM 118 is linked to the player. Memory 134 as referenced herein includes but is not limited to, computer readable media that includes but is not limited to, a hard drive, a solid state drive, a flash memory, random access memory, CD-ROM, CD-R, CD-RW, DVD-ROM, DVD-R, DVD-RW, and the like. Memory 134 may also include one or more database(s), in communication with the computer server(s) 102, where the database(s) may be configured to maintain players' accounts, registered subscriber identities 118 or records for player(s) network enabled communication devices(s) 108, player activities, player status, teams and individual activities, message posts, computer execution code executable by the server(s), for operations of the system server(s) and the system modules and the various other data necessarily stored by the system for the operation/functionality of the various system modules.

System 100 may also include an interaction module 122, which may be configured by way of computer executable code (by way of social network 104), to work or cause the display on network enabled communication device's display the social network and the various message posts 112, 112' enabling players to interact with a plurality of players and their respective posts 112, 112' on the social network 104. Interaction module 122 may include and/or be in communication with a processor (in another aspect, this may be processor 106) in communication with one or more input device(s) 130, wherein the interaction module 122 is configured for enabling player interaction with the at least one message post 112 via input device 130, wherein the interaction module 122 is further configured for enabling different player interactions by the plurality of players with the at least one message post 112 and for measuring a response to the at least one message post 112 and determining a qualitative and/or quantitative award to all players for whom a response was measured and for the player who originated the at least one message post 112.

System 100 further comprises a verification module 124 for activating privacy controls for intercepting the at least one message post 112 for controlling the display of the at least one message post 112 so that the true identity of the game player remains undisclosed and for verifying the veracity of the at least one message post 124. Verification module 124 may include a processor (in another aspect, this may be processor 106) and verification module code 140 (i.e. computer executable code executable by the processor) resident on the server 102, which when enabled causes the processor 106 to issue search requests to the systems memory 134 and/or one or more search engines, e.g. GOOGLE® to confirm the truth or falsity of the message post 112. Although players may post a message posts 112 on a wide variety of topics, the game may require the message post 112 to be independently verifiable, such that when the verification module 124 intercepts the at least one message post 112 a search request to an exemplary third-party search engine, e.g. GOOGLE® can yield confirmation as to the truth or falsity of the posting.

In some aspects of an embodiment of the invention verification module 124 may include verification module code 140, memory 134 and/or the processor, wherein certain facts that are considered common knowledge may be stored on system's memory 134 and retrieved by the verification module code 140 commanding the processor 106 to retrieve the information stored thereon. As such, the search requests issued by the verification module 124 may be issued to multiple sources.

System 100 also includes a communication module 126 in communication with the network enabled communication device 108, wherein the communication module 126 is configured for enabling communication between all system modules, and wherein the communication module 126 is further configured for enabling communication between the computer server 102 and the network enabled communication device 108 and the communications module 126 and is operative to connect to a wireless communications network. Communications module 126 may be include but is not limited to, a wireless communications means or wired communications means, such as a GSM modem, a WiFi module, a Bluetooth module, a Zigbee module, and any other type of communications means used to communicate directly with another device, or indirectly with another device, such as through a local or wide area network.

Memory module 128 may include a processor (in another aspect, this may be processor 106), a storage device that may include memory 134, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory module 128 may be used to access and store information, such as computer executable code, subscriber identities 118 linked to the player; codes for the various other modules, players scores, awards and/or statuses, 4' and the like some of which may be stored as data elements retrievable from memory module 128 using the computer processor 106.

Figure 2:
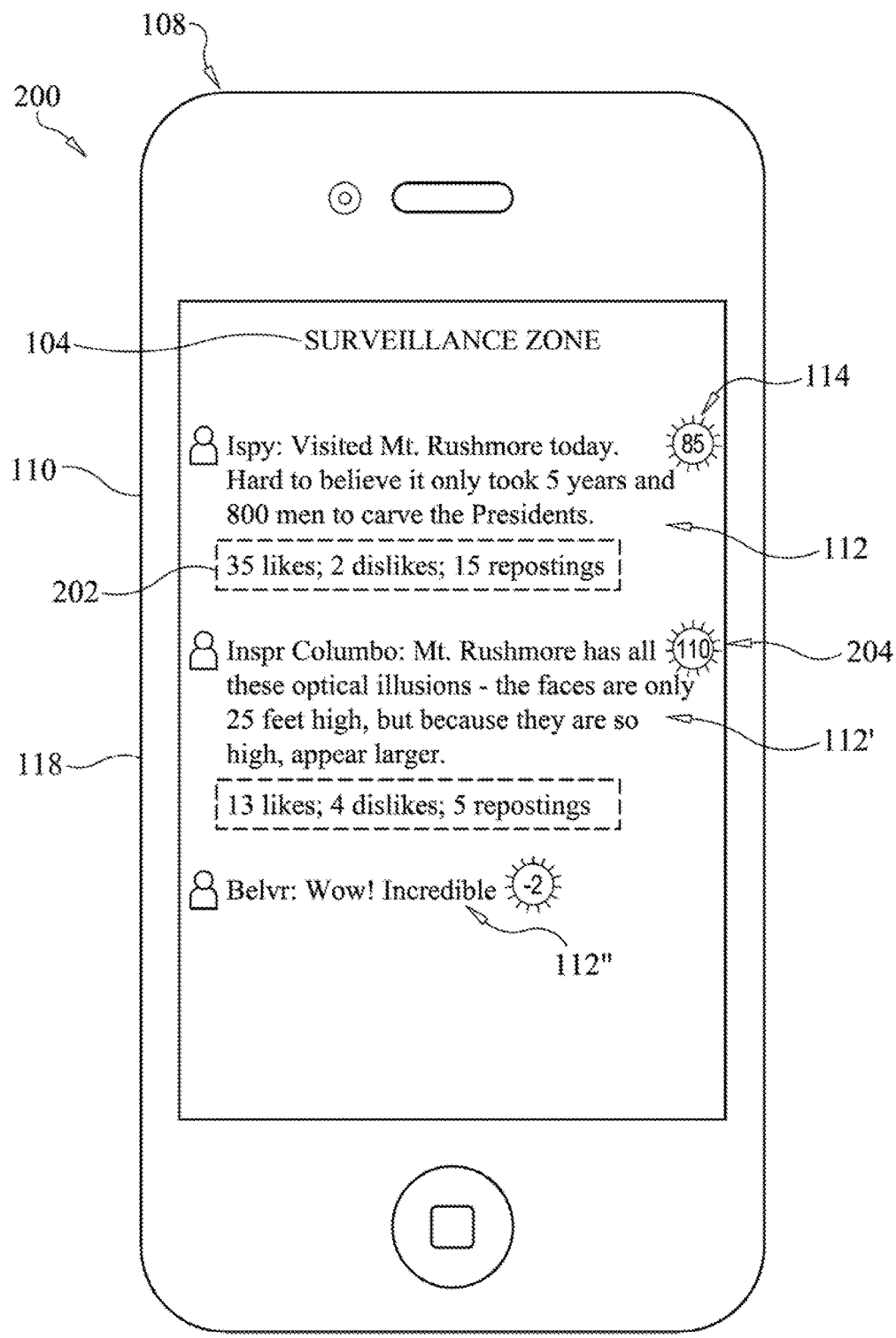
FIG. 2 shows an aspect of an exemplary embodiment of the system of the present invention.

FIG. 2 shows an aspect of an exemplary embodiment of the system 200 of the present invention. System 200 further comprises of at least one or more network enabled communication device(s) 108 for accessing the social network 104 that may have a display 114, which, in one aspect, may be used to interact with at least one or more of a plurality of players and their each respective message post(s) 112, 112', 112". System 200 is shown depicts an exemplary network enabled communication device(s) 108 having a display module 110', display 114, and communications module 126, and a SIM 118 for accessing the game's social network 104.

In the exemplary game as shown, the social network 104 is being displayed on the display 114 after the presence of the SIM 118 has been detected by the determination module 116 and the player's identity has been verified by the authentication module 120. Players earn points and win prizes by just posting at least one or more message post 112 to the social network 104 shown herein as "Surveillance Zone." In some embodiments, each player plays anonymously (true identity outside of the game is unknown) so that all players are at least initially tasked with determining the truth or falsity of any new message post 112 without being influenced by the individual player's fame, notoriety and/or influence outside the game. The goal for all players is to increase his/her spy status and earn rewards (e.g. points or virtual currency) and ultimately to gain control of different geographic regions around the world, which is accomplished through gaining influence with each of the player's message post 112, acquiring virtual wealth and influence and in some instances dethroning other's and/or reducing their wealth and influence. Player's registration is received by the system 200 that initially assigns the status of a "Mole" to all new players who receive basic access to avatar choices for his/her game moniker/handle. The Mole may respond to pre-existing message post 112 and/or post a message post 112 of his/her own that may either be fake or real and for which the other players can decide to like, dislike, share and/or not to share with other. In some embodiments, the response 202 (e.g. likes, dislikes, reposts) may be held confidential and are only displayed to the individual author of the message post 112, while in other embodiments the response 202 is publicly shared. All the players' status (levels of play) are hidden except for their score, the higher their score the more influential they are and the faster they move up in status (rank) to become the Top Director.

Verification module 124 intercepts each new message post 112 to determine the veracity of the message post 112, and in some embodiments maintains a metadata tag and/or flag attached to the message post 112 indicating whether the message post 112 is determined to be true or false. In this manner, message posts 112 can be quantitatively and qualitatively measured for awarding points and/or other rewards to the original author of the message post 112 and or other players responding to the message post 112. For example, if the message post 112 is false and another player shares the message post 112 and/or reposts the message post 112 in its entirety, the player sharing another's message post 112 that is false loses points for sharing. The reverse is also true as if the message post 112 is real or perceived to be real and/or receive several likes by the plurality of players, the original author of the message post 112 may earn a reward (e.g. points and/or virtual currency and is considered to be influential). The topics being addressed in the spy game that are the subject of the message posts 112 are unlimited and may range from geography, history of a particular region, politics, current events, and the like. As a player posts his/her message post 112, a story develops that is being dynamically created by the players with truth and falsities embellishing the story. The better the player's message posts 112, 112' (i.e. perceived as being true), the more desirable a player ("Mole") is to players of a higher status, e.g. (Handler and/or Directors), who ultimately wants to controls as many players (Moles) as possible.

In some embodiments of the invention, players may be recruited by a higher ranking player, e.g. Moles are recruited by Handlers to become Shadow Agents based on the Mole's score (influence) 202, and so on (e.g. a Handler continues to be promoted until hired by a Director, or eventually becoming a Director. Agents can manipulate Directors and become Double Agents by providing false or misleading information to competing Directors). The interaction module 122 in communication with the at least one processor 106 is configured for measuring a response 202 to the at least one message post 112 and determining a qualitative and/or quantitative award to each individual player for whom a response 202 was measured (original author and responding players). In some embodiments, the interaction module 122 is configured for automatically promoting a player to a higher status after attaining a predetermined amount of points, while in other embodiments, promotion to a higher rank is by invitation only of a higher ranked layer for which in some embodiments, the interaction module 122 is configured for providing confidential and private notification (e.g. SMS text and/or email) to one or more players with a high score 204 to encourage communications and recruiting of one or more lower ranking players for his/her team. In some embodiments of the invention the confidential and private notification is geographically based and/or related to shared/compatible communications network service provider.

In some embodiments of the invention, the higher ranked players, e.g. Directors, may solicit a lower/equal/higher ranked player to infiltrate other regions with Double Agents that deliberately post fake information to affect other players and lower their points (wealth and/or influence), thereby gaining control of different geographical regions around the world. As players gain points they are able to purchase via the interaction module 122, virtual gadgets, weapons, and information from other players in order increase their influence using the currency awarded to the players upon attaining certain points and/or electing virtual currency in lieu of points.

Interaction module 122 is also configured for using the interaction module code 138 (computer executable code executable by the processor), which when enabled can use the interaction module code 138 to search the various message post 112 for certain keywords (e.g. "punishment," "blown", "burned", "exile," "treason", "infiltrate", "convene", "court martial," "sentence(d)") to track and monitor message post 112, 112', 112' for determining which player will be adversely affected according to the game's protocol for a corresponding conduct. In some embodiments, any adverse rulings, ability to play, (e.g. banishment or exile) are stored as a flag/metadata with the player's subscriber's identity 118, such that when the authentication module 120 verifies the identity of the player, his/her rank and/or the status of any adverse rulings instituted against the player are readily determined and interaction module 122 may impose access and/or operational restrictions on the player during game play.

Interaction module 122 is also configured for implementing the various differentiation of accessibility and perks of the game for all players. For example, the interaction module 122 when enabled can use the interaction module code 138 to provide a Director with access to virtual currency, performing an accounting and keeping record of the debits, credits and/or balances for the individual directors since the Directors have the ability to bid and profit from the message post 122 of their lower ranking teammate, e.g. their AOI; receive instructions from a higher ranking player (e.g. Director) to selectively deduct points from lower ranking teammate, (e.g. a players who posted negative or ineffective message post 112); deduct points from a player; generating codes and/or icons wherein the codes or icons represent coded communications between at least one or more players, who share the unlocking key(s) to decipher the code; generate codes/icons and deciphering keys; posts and/or receive bids from various players for recruitment; track team and its individual team players' performances.

Figure 3:
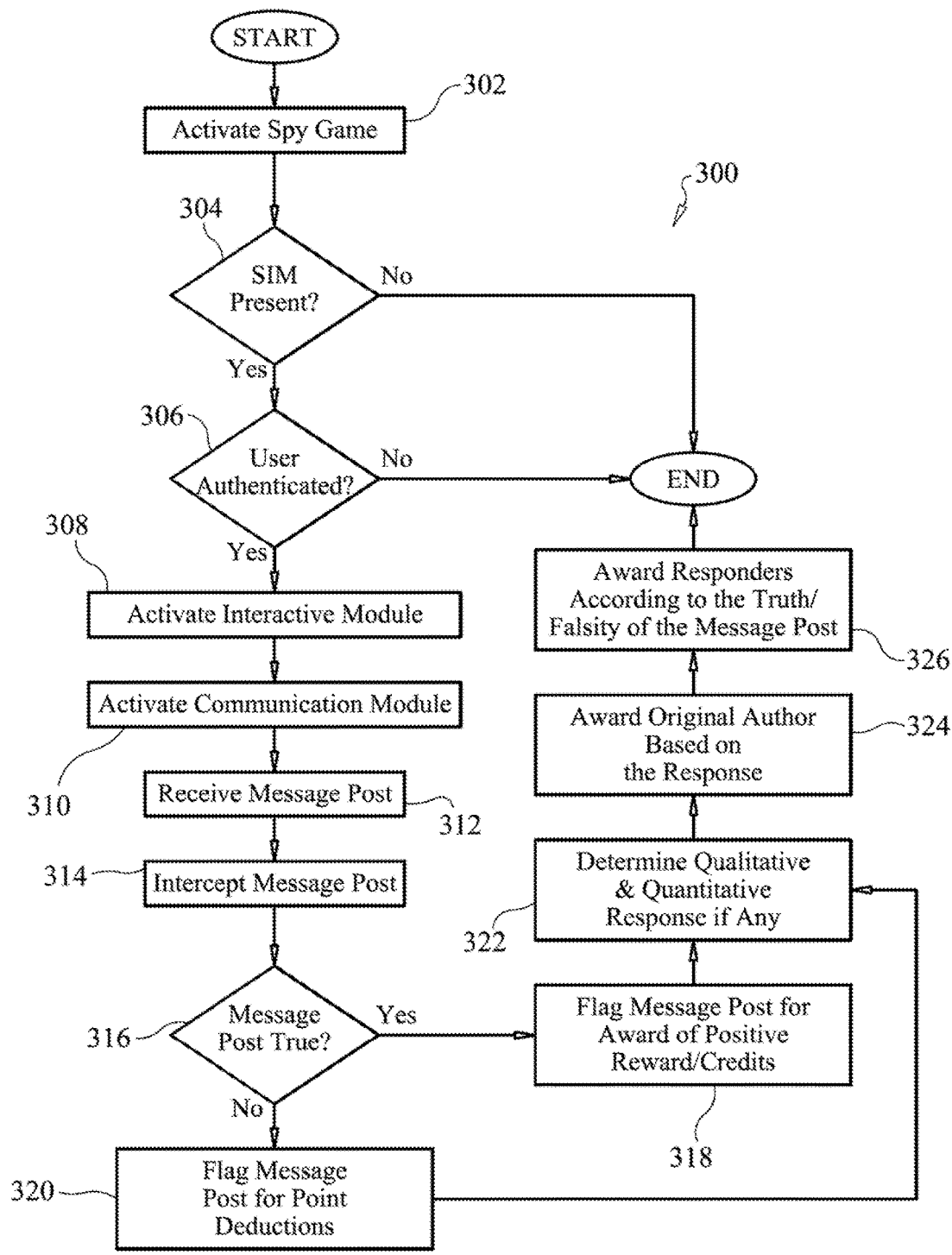
FIG. 3 shows an exemplary process flow according to an embodiment of the present invention.

FIGS. 3A & 3B show an exemplary process flow 300 according to an embodiment of the present invention. Process 300 begins with step 302 where a player may access the game via for instance a Uniform Resource Locator or a software game application program ("game app") that may comprise in part of a browser, such as for use on the network enabled communication device 108 and the full-sized software program may be on the computer server 102, where communications may occur over a computer network, either wired or wirelessly.

Using his/her network enabled communication device 108 player may activate the social network 104 (spy game) (step 302). At step 304 determination module 116 analyzes the network enabled communication device 108 and determines whether a SIM 118 is present in the networked enabled communication device 118 being used by the at least one player to access the social network 104. This determination may be made possible by interaction between processor 106 and determination module code 132. In one aspect of an embodiment of the present invention, determination module 116 may include a processor (in another aspect, this may be processor 106) and determination module code 132 resident on system 100. Determination module code 132, upon execution, enables processor 106 to act as an embedded SIM card reader in order to detect the presence of the SIM 118 within the network enabled communication device 108. If the SIM 118 is detected, the process proceeds to the decisional element 306 for authentication of the player. If no SIM 118 is detected, the process 300 process ends.

At step 306, the authentication module 120 authenticates the at least one player's identity with at least one registered subscriber identity linked to the at least one player. Authentication may be made possible by interaction between processor 106 and authentication module code 120, which when enabled causes the processor 106 to inquire and capture the SIM 112 and/or the subscriber identity from the determination module code 132 that the authentication module code 136 issues a confirmation search request of the system's memory 134 as to whether the detected SIM 118 is linked to the player. If the player is authenticated as being a registered player linked to the subscriber identity linked to the network enabled communicate device 102 being used to access the social network 104, player may proceed for game play (step 308 and beyond). If the player cannot be authenticated, e.g. unregistered and/or the SIM 118 fails to match the registered subscriber identity linked to the player, the player will not have access to the game and the social network access aborts.

Processor 106 that is in communication with the various modules detects the authentication of the player and as such activates the interactive module 122 (step 308) and the communication module 126 (step 310), wherein the communication module 126 enables communication between all system modules, wherein the communication module 126 is further configured for enabling communication between the computer server 102 and the network enabled communication device 108. Network enabled communication device 108 is then connected to the social network 104.

Upon activation of interaction module 122 in step 308 execution of related code for interaction module 122 by processor 106 would display social network 104 and related accessible message posts 112, 112'. The player is then enabled to perform the necessary operation/activities within the game using by way of example an input device 130 and/or network enabled communication device 108 for which any restrictions that are imposed are dependent on the level/status of the player and/or any restrictions linked to the player's subscriber identity.

Player may interact with the game to, for example, post a message post 112, for which the activated interaction module 122 receives the message post 112 (step 312), for which the verification module 124 intercepts the at least one message post 112 (step 314) and verifies the veracity of the at least one message post 112 (step 316). Verification module 124 may include a processor (in another aspect, this may be processor 106) and verification module computer executable code 140 resident on system 100, which upon execution enables processor 106 to issue search requests to one or more search engine, e.g. GOOGLE® and/or memory 134 to confirm the truth or falsity of the message post 112. If the message post 112 is false, the verification module via verification module code 140 flags and/or tags the message post for point deductions to be awarded to other players who respond positively to the false message post 112. If the message post 112 is true, verification module 112 flags the message post for awarding positive credits (rewards and/or points).

At step 322, interactive module 122 determines the qualitative and/or quantitative response if any to the message post for determining what points/awards will be credited and/or debited to the player who originated the message post 112 and/or the players who responded either positively (liked and/or reposted the message post 112 or negatively (disliked) the message post 112. If there is a response, interactive module 122 awards the original author of the message post 112 based on any determined qualitative and/or quantitative response to the message post 112 (step 324) and award responders according to the truth or falsity of the message post 112.

Figure 4:
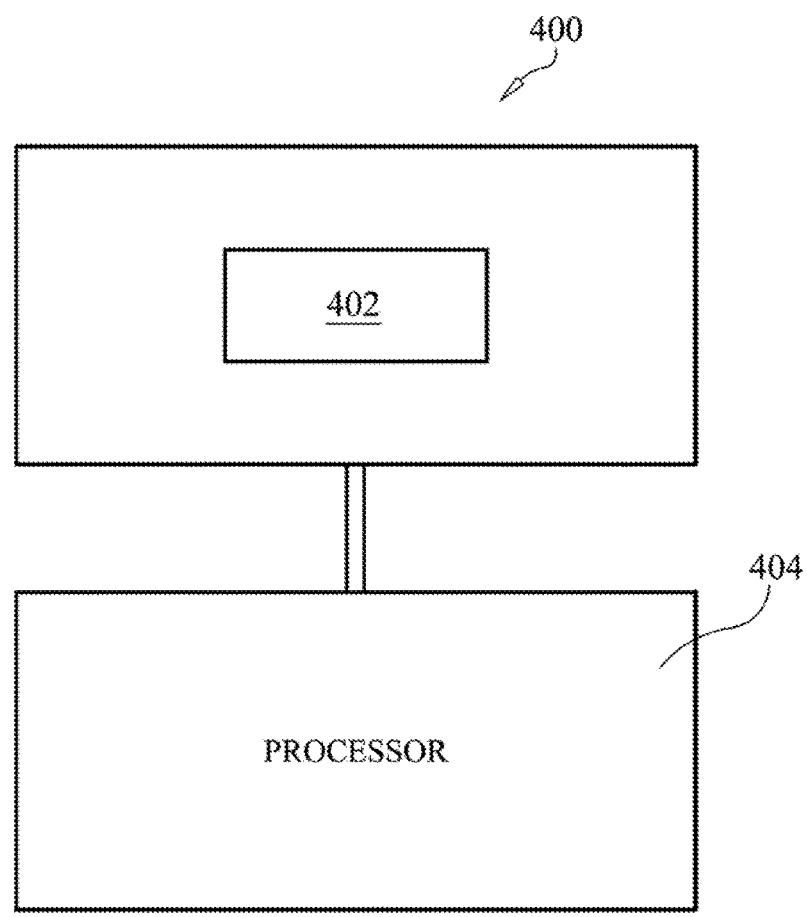
FIG. 4 shows an exemplary process flow according to an embodiment of the present invention.

Referring now to FIG. 4, an exemplary block diagram depicting a non-transitory computer readable medium 400 according to an aspect of an embodiment of the present invention is shown. Here, computer readable medium 400 may comprise computer executable instructions 402 readable by at least one processor 404 and operative to perform any or all of the following steps and/or functions, for example: launching a social network 102 configured for enabling at least one player to post at least one message post 112 and/or interact with a plurality of players and at least one message post for at least one of the plurality of players on the social network; following launch of the social network 102, determining the presence of at least one Sim 118; determining presence of at least one SIM 118 in a networked enabled communication device 108 being used by at least one player; authenticating the at least one player's identity with at least one registered subscriber identity linked to the at least one player; enabling player interaction with the at least one message post 112, enabling different player interactions by the plurality of players with the at least one message post 112 and for measuring a response 202 to the at least one message post 112 and determining a qualitative and/or quantitative award to all players for whom a response was measured and for the player who originated the at least one message post 112; verifying the veracity of the at least one message post 112; and enabling communication between all system modules, and/or between the computer server 102 and the network enabled communication device 108.

In some aspects of embodiments of the present invention, processor(s) 404 may be part of or integrated into a computer sever 102. In one aspect, computer executable instructions 402 may be stored, in whole or in part, remotely, such as in a server 102 or central station, or locally, such as in the network enabled communication device 108.

Non-transitory computer readable medium 400 may comprise any type non-transitory computer readable medium, such as, but not limited to, a hard drive, a flash drive, a solid state drive, computer memory, a compact disc, a DVD, and the like. Computer readable medium 500 may comprise any of the various embodiments described herein, such as those described with reference to FIGS. 1 through 3.

In some embodiments, computer executable instructions 402 may comprise the various embodiments of computer executable instructions described herein, such as those described above with reference to FIGS. 1-3. Computer executable instructions 402 may be part of, used in, or be included in the various systems and methods described herein.

In aspect(s) of embodiment(s) of the present invention, a software program may be launched from a computer readable medium in computer-based systems to execute the functions defined in the present invention. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Hardware and Operating Environment

This section provides an overview of exemplary hardware and operating environments in conjunction with which embodiments of the inventive subject matter can be implemented, as shown in FIG. 6. A software program may be launched from a computer readable medium in a computer-based system to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as Assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed below.

Figure 5:
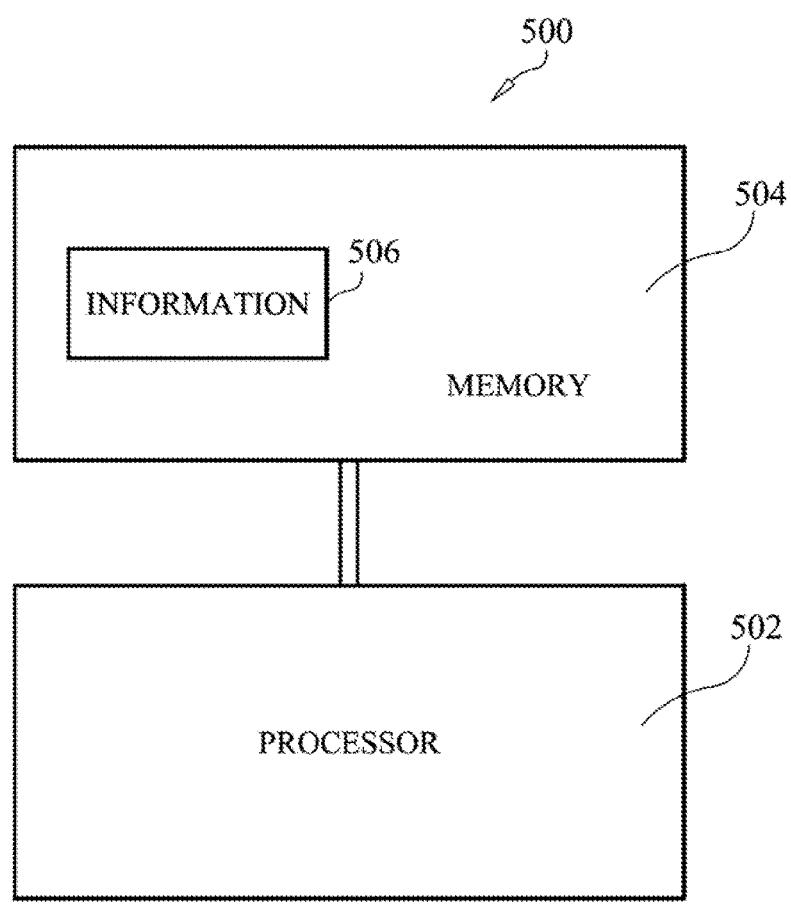
FIG. 5 shows a block diagram representing an article according to various embodiments.

Referring now to FIG. 5, an article 500 comprising hardware and software may be provided in accordance with various embodiments. Such embodiments may comprise a cable box, computer, a memory system, a magnetic or optical disk, some other storage device, or any type of electronic device or system. The article may include one or more processor(s) 502 coupled to a machine accessible medium such as a memory 504 (e.g., a memory including electrical, optical, or electromagnetic elements). The medium may contain associated information 506 (e.g. computer program instructions, data, or both) which, when accessed, results in a machine (e.g. the processor(s)) performing the activities previously described herein.

The principles of the present disclosure may be applied to all types of computers, systems, and the like, include desktop computers, servers, notebook computers, personal digital assistants, and the like. However, the present disclosure may not be limited to the personal computer. While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. An electronic game system comprising:
   a computer server for hosting a social network;
   at least one processor in communication with the computer server;
   a network enabled communication device in communication with the at least one processor and configured for activating a displaying module to broadcast at least one message post of at least one player of a plurality of players and display the at least one message post on a display of the network enabled communication device; wherein the network enabled communication device further comprises a card reader;
   a determination module in communication with the at least one processor, wherein the determination module is configured for determining whether a spy game subscriber identification module card is present in the card reader, and if so, whether the spy game subscriber identification module card corresponds to a spy game subscriber identification module card associated with the at least one player's identity;

an authentication module in communication with the at least one processor, wherein the authentication module is configured for authenticating the at least one player's identity with at least one registered subscriber identity linked to the at least one player;

an interaction module in communication with the at least one processor wherein the interaction module is configured for enabling player interaction with the at least one message post, wherein the interaction module is further configured for enabling different player interactions by the plurality of players with the at least one message post and for measuring a response to the at least one message post and determining a qualitative and/or quantitative award to all players for whom a response was measured and for the player who originated the at least one message post;

a verification module for verifying the veracity of the at least one message post, wherein verifying the veracity of the at least one message post comprises comparing a first fact contained in the message post with a second fact stored on a non-transitory computer readable medium connected to the processor or the server, and if the first fact matches the second fact then the veracity of the at least one message post is verified; and a communication module in communication with the network enabled communication device, wherein the communication module is configured for enabling communication between all system modules, wherein the communication module is further configured for enabling communication between the computer server and the network enabled communication device.

2. The system of claim 1, further comprising the verification module configured for activating privacy controls for intercepting the at least one message post for controlling the display of the at least one message post.

3. The system of claim 1, further comprising the interaction module being configured for determining the social influence of a particular player based on the number of repostings of the individual player's posts.

4. The system of claim 1, further comprising the interaction module being configured for awarding points towards accumulated status to player for reposting verifiable true postings.

5. The system of claim 1, further comprising the interaction module being configured for deducting points towards accumulated status to player for reposting unverified postings.

6. The system of claim 1, further comprising the interaction module being configured for requiring a timed response to message post.

7. The system of claim 1 further comprising the interaction module being configured for generating codes and/or icons wherein the codes or icons represent coded communications between at least one or more players.

8. The system of claim 1 further comprising the interaction module being configured for posting and/or receiving bids from various players for recruitment; track team and its individual team players' performances.

9. The system of claim 1 further comprising the interaction module being configured for awarding the original author of the message post based on any determined qualitative and/or quantitative response to the message post.

10. A computer-implemented method for conducting an electronic spy game, comprising executing on a processor the steps of:
launching a social network configured for enabling at least one player to post at least one message post and/or interact with a plurality of players and at least one message post for at least one of the plurality of players on the social network;

following launch of the social network, determining the presence of at least one spy game subscriber identification module card in a card reader of a network enabled communication device;

authenticating the at least one player's identity with the at least one spy game subscriber identification module card, wherein authenticating comprises determining whether a spy game subscriber identification module card is present in the card reader, and if so, whether the spy game subscriber identification module card corresponds to a spy game subscriber identification module card associated with the at least one player's identity;

activating a verification module for verifying the veracity of the at least one message post, wherein verifying the veracity of the at least one message post comprises comparing a first fact contained in the message post with a second fact stored on a non-transitory computer readable medium connected to the processor or the server, and if the first fact matches the second fact then the veracity of the at least one message post is verified;

displaying the at least one message post on a display of a networked communication device while withholding the determination of the veracity of the least one message post from the display;

enable different player interactions by the plurality of players with the at least one message post and determining a qualitative and/or quantitative award for the response.

11. The computer-implemented method of claim 10, further comprising activating privacy controls for intercepting the at least one message post for controlling the display of the at least one message post.

12. The computer-implemented method of claim 10, further comprising determining the social influence of a particular player based on the number of repostings of the individual player's posts.

13. The computer-implemented method of claim 10, further comprising awarding points towards accumulated status to player for reposting verifiable true postings.

14. The computer-implemented method of claim 10, further comprising deducting points towards accumulated status to player for reposting unverified postings.

15. The computer-implemented method of claim 10, further comprising requiring a timed response to message post.

16. The computer-implemented method of claim 10, further comprising generating codes and/or icons wherein the codes or icons represent coded communications between at least one or more players.

17. The computer-implemented method of claim 10, further comprising posting and/or receiving bids from various players for recruitment; track team and its individual team players' performances.

18. A computer program product comprising a non-transitory computer readable medium having computer executable instructions stored thereon for causing a computer processor to perform a method comprising the following steps:
launching a social network configured for enabling at least one player to post at least one message post and/or interact with a plurality of players and at least one message post for at least one of the plurality of players on the social network;

determining presence of at least one spy game subscriber identification module card in a card reader of a networked enabled communication device, and if so, whether the spy game subscriber identification module card corresponds to a spy game subscriber identification module card associated with the at least one player's identity;

authenticating the at least one player's identity with at least one registered subscriber identity linked to the at least one player;

verifying the veracity of the at least one message post, wherein verifying the veracity of the at least one message post comprises comparing a first fact contained in the message post with a second fact stored on a non-transitory computer readable medium connected to the processor or the server, and if the first fact matches the second fact then the veracity of the at least one message post is verified; and measuring a response to the at least one message post and determining a qualitative and/or quantitative award to all players for whom a response was measured.

19. The computer program product of claim 18 further comprising computer readable program code for enabling communication between all system modules, and/or between a computer server and the network enabled communication device.

20. The system of claim 1, wherein the identity comprises a unique identification number, wherein the unique identification number is associated with a specific internet protocol address for the network enabled communication device or the spy game subscriber identification module card.

* * * * *